United States Patent [19]

Simon

[11] Patent Number: 5,676,339
[45] Date of Patent: Oct. 14, 1997

[54] EASILY REMOVABLE CABLE STRAIN RELIEF DEVICE

[76] Inventor: Hans Simon, Freier Erfinder, Bruchhausenerstr. 13, D-53572 Unkel/Rhein, Germany

[21] Appl. No.: 402,649

[22] Filed: Mar. 13, 1995

[51] Int. Cl.⁶ .................................................. F16L 5/00
[52] U.S. Cl. .......................... 248/56; 174/153 G; 248/73
[58] Field of Search .......................... 248/56, 27.3, 73; 439/459, 460, 470; 174/65 G, 153 G

[56] References Cited

U.S. PATENT DOCUMENTS

| | | | |
|---|---|---|---|
| 4,000,875 | 1/1977 | Jemison et al. | 248/56 |
| 4,188,003 | 2/1980 | Ramsey | 248/56 |
| 4,299,363 | 11/1981 | Datschefski | 248/56 |
| 4,919,370 | 4/1990 | Martin et al. | 248/56 |
| 5,014,938 | 5/1991 | Potzas | 248/56 |
| 5,238,426 | 8/1993 | Arnett | 248/27.3 X |
| 5,374,017 | 12/1994 | Martin et al. | 248/56 |
| 5,442,141 | 8/1995 | Gretz | 248/56 X |

*Primary Examiner*—Derek J. Berger
*Attorney, Agent, or Firm*—Joseph Zallen

[57] ABSTRACT

An easily removable and reusable cable strain relief device for accommodating and fastening a cable in a socket hole in an instrument wall. The head section (2) has a collar (3) which lies flush against the outer edge of the socket hole (8) and a shaft (4) with U-shaped catch lugs (5) and (6) engaging the inner edge of the socket hole (8) and pressing against the cable (14). Cable lug (5) is externally accessible for pivoting so as to disengage the device from the socket hole.

3 Claims, 2 Drawing Sheets

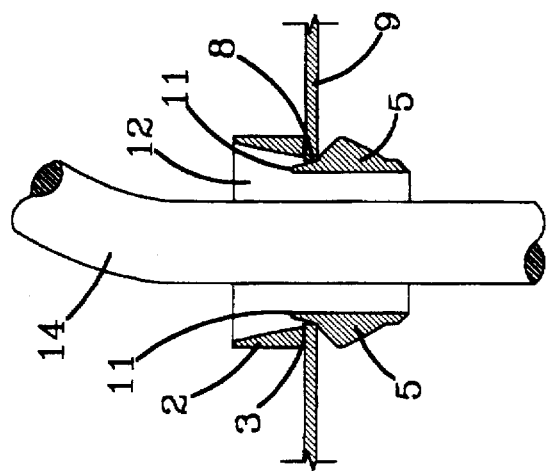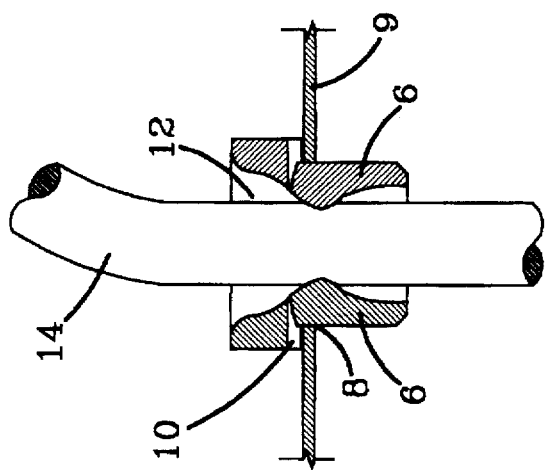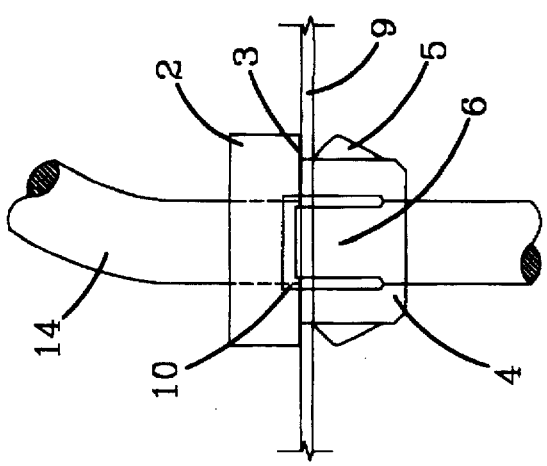

EASILY REMOVABLE CABLE STRAIN RELIEF DEVICE

BACKGROUND OF THE INVENTION

The present invention relates to a removable cable strain relief device, which has an axial recess. The recess accommodates a cable, for fastening (with strain relief) the cable in a socket hole in an instrument wall. The device comprises a head section with a collar which lies flush against the outer edge of the socket hole and a shaft with two catch lugs protruding in a U shape to engage the inner edge of the socket hole and two locking lug also protruding in a U-shape which can press inwards against the cable.

Prior art devices have been described in U.S. Pat. No. 4,216,930 and German Patent DE 32 11 511 of the present applicant. This cable strain relief device can be disengaged by rotating it about its longitudinal axis and then removed from the socket hole. To this end the socket hole is oval or rectangular or comprises two semicircles offset relative to each other.

In this opposed angular position the shaft of the cable strain relief device can be inserted, thereby bringing the collar flush against the upper or outer edge of the socket hole. If the cable strain relief device is now rotated a wedge-shaped wing molded on each side of the outer edge of its locking lugs is engaged below the inner edge of the socket hole, such that the cable strain relief device is secured against axial withdrawal. Simultaneously, the act of rotation presses the locking lugs against the cable, thereby relieving the cable of strain. The outward-facing rear of the locking lugs is curved outwards in the peripheral direction for this purpose.

This spatial form of the cable strain relief device of the prior art is relatively complicated and thus expensive to manufacture. A special socket hole described is also required.

In particular, however, once the prior cable strain relief device has been rotated into its fixed position in the socket hole it can only be rotated back to its opening position if a relatively high torque is applied since the locking lugs are pressed against the cable on the inside and against the socket hole wall on the outside with a relatively high contact pressure. For this reason relatively large spanner contact faces are required on the head of this cable strain relief device, and a spanner with the appropriate width across flats must be available.

Furthermore in the device described in German Patent DEPS 32 11 511 cams which are sprung in the axis direction and which each engage an additional opening at the edge of the socket hole are molded on the head section collar. Each of these sprung cams must first be disengaged which is an awkward matter.

Thus although for these reasons the cable strain relief devices known in the prior art are removable and thus re-usable, such action can only be carried out with difficulty.

In the light of this it is the object of the present invention to provide a cable strain relief device which is relatively easy to construct and thus inexpensive to manufacture but which can nevertheless easily be disengaged from its locked position, removed from the socket hole and then re-used.

SUMMARY OF INVENTION

This object is resolved in the invention by means having the catch lug accessible from outside by a screwdriver in order to pivot it radially inwards to disengage the cable gland and remove it from the socket hole where the rear of the locking lug which rests against the socket hole inner wall is inclined longitudinally or in the direction of insertion and extends its upper edge into a groove in the head section.

By contrast with the prior art, the cable strain relief device according to the present invention is engaged in its locked position not by rotation but by axial insertion. In so doing, the locking lugs serve only to clamp the cable while the sole task of the catch lugs is to engage the lower/inner edge of the socket hole. The catch lugs can be relatively easily pivoted radially inwards from outside about their lower edge such that they are disengaged from the edge of the socket hole, after which the cable strain relief device can be withdrawn from the socket hole together with the cable. Since the locking lugs each extend into a groove in the head section, this ensures that they do not impair the withdrawal process.

In the preferred embodiment of this invention the shaft is rectangular with the catch lug provided on one side and at least one rigid cam which engages the socket hole provided on the opposite side.

BRIEF DESCRIPTION OF DRAWING

Two embodiments of this invention are described below with reference to the drawing in which:

FIG. 4 shows a side view as per FIG. 2 after engagement;

FIG. 5 shows an axial segment longitudinally through line V—V as per FIG. 4;

FIG. 6 shows in the same way an axial segment longitudinally through line VI—VI as per FIG. 3;

FIG. 7 shows a second embodiment in perspective;

FIG. 8 shows this device rotated through 90°.

SPECIFIC EXAMPLES OF INVENTION

Figure 1:
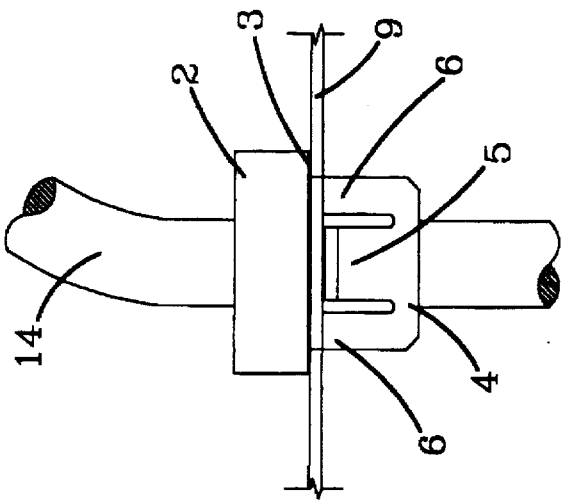
FIG. 1 shows a side view of a first embodiment prior to engagement.
Figure 2:
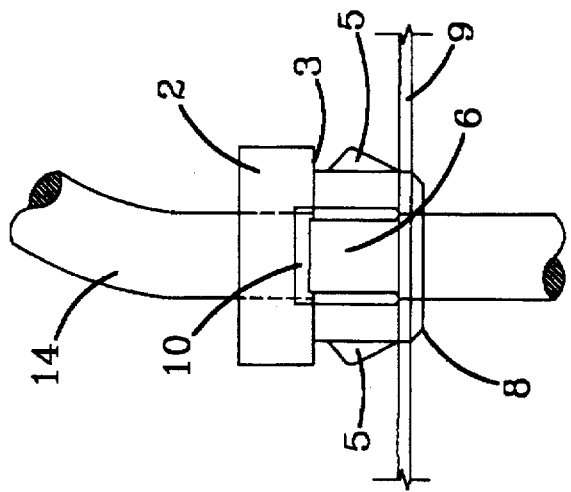
FIG. 2 also shows a side view prior to engagement, rotated through 90° relative to FIG. 1.
Figure 3:
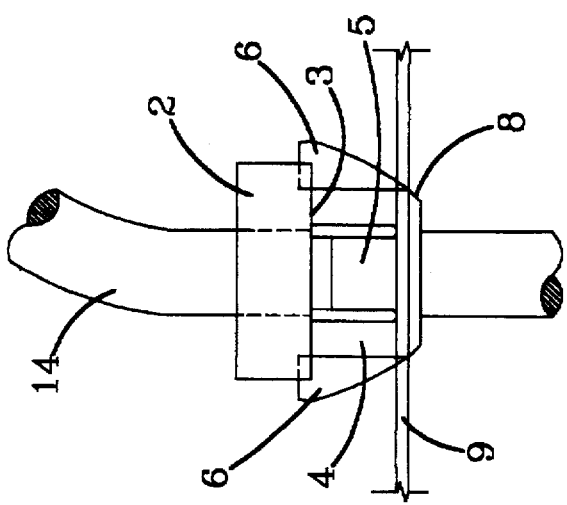
FIG. 3 also shows a side view, as per FIG. 1, but after engagement.

Referring now to the embodiment illustrated in FIGS. 1–6, cable 14 is passed through a socket hole 8 in an instrument wall 9 and held firmly with strain relief in this socket hole. The cable is clamped in an axial recess in the cable gland while the cable strain relief device is locked in the socket hole 8.

The device comprises a head section 2 and a shaft 4. Shaft 4 fits in socket hole 8, i.e. it can be inserted into the socket hole with the lower edge or collar 3 of the head section 2 lying flush against the outer edge of the socket hole 8.

Shaft 4 has a catch lug 5 at each of two diametrically opposed locations. The two catch lugs 5 along with a bottom of shaft 4, form a U shape portions, i.e. they are only connected to the shaft 4 by their lower edges. The lower edges of the catch lugs 5 continue integrally into the lower edge of the shaft 4, while the catch lugs 5 are separated from the shaft 4 laterally and at their upper edge by slits. In this way the catch lugs can be pivoted radially inwards about their lower edge which acts as a joint, with sufficient space being left between the catch lugs 5 and the cable 14. When the shaft 4 is inserted into the socket hole 8 each lower inclined area of each catch lug slides over the edge of the socket hole, causing the catch lug to be pivoted inwards. Once insertion is complete the catch lugs spring outwards, causing their upper inclined areas to engage the inner edge of the socket opening. In this way the cable strain relief device is securely locked in the socket hole.

Each catch lug 5 has an extension 11 which protrudes upwards through the socket hole 8 into free space or an annular space in said collar 3 which is open to the top. This extension 11 is accessible from above or from outside by a screwdriver or similar small lever with which the catch lug can be pivoted radially inwards until its outer edge lies within the socket hole. The lock is thus disengaged, and the device can be withdrawn axially together with the cable. An appropriately large chamber or empty space is left between the catch lug 5 or its extension 11 and the cable 14.

Two locking lugs 6, which are also configured in diametric opposition, are provided between each of the catch lugs. The two locking lugs 6, along with a bottom of shaft 4, form a U-shape portions, i.e. the locking lugs' lower edges continue integrally into the lower edge of the shaft 4. The locking lugs 6 can be pivoted radially inwards about this lower edge as a joint. The inner radial surface of the locking lugs 6 is curved convexly while the outer radial surface of each locking lug 6 is inclined against the axial direction or direction of insertion such that when untensioned they project beyond, i.e. above or outside, the edge of the socket hole 8. When the device is inserted into the socket hole 8, the locking lugs 6, whose rear faces slide against the socket hole, are pivoted radially inwards, causing their inner surfaces to be pressed against the cable 14, by which means the cable is clamped or wedged in the socket hole. The cable 14 is thus fixed in the instrument wall socket hole with strain relief.

The head section 2 has grooves 10 into which the upper part of each locking lug 6 fits. This ensures that when the device is inserted the rear of each locking lug 6 projects upwards beyond the socket hole 8 such that the locking lugs do not impair withdrawal of the cable gland.

The embodiment illustrated in FIGS. 7 and 8 corresponds to that illustrated in FIGS. 1 to 6 with the exception that its outer periphery is in the form of a rounded rectangle, whereas the embodiment shown in FIGS. 1 to 6 is primarily intended for round designs. Also, a laterally-open channel 12 is formed in the collar 2 to accommodate the disengagement extensions 11 of the catch lugs 5 in which the extensions 11 can be pivoted radially inwards for the purpose of disengagement.

I claim:

1. An easily removable and re-usable cable strain relief device having an axial recess, said device being adapted to fasten a cable in a socket hole in an instrument wall; said device comprising a head section (2) having a groove (10) on each side thereof and a collar (3) adapted to lie flush against an outer edge of such a socket hole (8); a shaft (4) with at least two catch lugs (5) forming a U-shaped protrusion along with a bottom of the shaft (4), for engaging an inner edge of such socket hole (8) and at least two locking lugs (6) forming a U-shaped protrusion along with a bottom of the shaft can press inwards against such a cable (14); each said catch lug (5) comprising an extension (11) extending into an annular area of said collar, said extension being externally accessible, so as to be pivoted radially inwards in order to disengage and thus remove said device from such socket hole; rear portions of said locking lugs (6) adapted to be supported against such socket hole and inclined relative to a direction of insertion with upper edges extending into said grooves (10).

2. The device of claim 1 characterized therein that the catch lug (5) contains a protruding extension (11).

3. The combination of an instrument having a wall, a socket hole in said wall, an easily removable and reusable cable strain relief device positioned in said socket hole, and a cable fastened in said socket hole by said device; said strain relief device having an axial recess which accommodates said cable in said socket hole and comprising a head section (2) having a groove (10) on each side thereof and a collar (3) which lies flush against an outer edge of said socket hole (8); a shaft (4) with at least two catch lugs (5) forming a U-shaped protrusion along with a bottom of the shaft (4), engaging an inner edge of said socket hole (8) and at least one U-shaped locking lugs (6) forming a U-shaped protrusion along with a bottom of the shaft (4), which press inward against said cable (14); said catch lug (5) being externally accessible from an area adjacent the outer edge of said socket hole so as to be pivoted radially inwards to disengage and remove the device from said socket hole; rear portions of said locking lug (6) being supported against said socket hole and inclined relative to a direction of insertion with upper edges extending into said grooves (10).

* * * * *